(12) United States Patent
Nishimura et al.

(10) Patent No.: US 7,547,489 B2
(45) Date of Patent: Jun. 16, 2009

(54) ELECTROCHEMICAL DEVICE

(75) Inventors: Ken Nishimura, Moriguchi (JP); Naoto Arai, Ikoma (JP); Toru Oshima, Moriguchi (JP); Fumio Daio, Osaka (JP); Munehisa Ikoma, Shiki-gun (JP); Hideo Kaiya, Chigasaki (JP)

(73) Assignee: Panasonic Corporation, Osaka (JP)

( * ) Notice: Subject to any disclaimer, the term of this patent is extended or adjusted under 35 U.S.C. 154(b) by 384 days.

(21) Appl. No.: 10/540,862

(22) PCT Filed: Dec. 9, 2003

(86) PCT No.: PCT/JP03/15757

§ 371 (c)(1),
(2), (4) Date: Jun. 27, 2005

(87) PCT Pub. No.: WO2004/062003

PCT Pub. Date: Jul. 22, 2004

(65) Prior Publication Data

US 2006/0099493 A1  May 11, 2006

(30) Foreign Application Priority Data

Dec. 27, 2002 (JP) .............................. 2002-380939
Jan. 31, 2003 (JP) .............................. 2003-024988

(51) Int. Cl.
*H01M 10/50* (2006.01)
(52) U.S. Cl. .................... 429/122; 429/62; 429/234; 429/94
(58) Field of Classification Search ................ 429/122, 429/62, 234, 94
See application file for complete search history.

(56) References Cited

U.S. PATENT DOCUMENTS

| | | |
|---|---|---|
| 5,423,110 A | 6/1995 | Gauthier et al. |
| 5,521,028 A | 5/1996 | Gauthier et al. |
| 5,567,544 A | 10/1996 | Lyman |
| 6,335,114 B1 | 1/2002 | Ueshima et al. |
| 6,475,664 B1 | 11/2002 | Kawakami et al. |
| 6,726,733 B2 | 4/2004 | Lee et al. |
| 2001/0003863 A1* | 6/2001 | Thibault et al. ............ 29/623.1 |
| 2002/0160258 A1 | 10/2002 | Lee et al. |

FOREIGN PATENT DOCUMENTS

EP    1 035 604 A1    9/2000

(Continued)

OTHER PUBLICATIONS

Japanese Office Action issued in Japanese Patent Application No. JP 2003-053841, mailed Apr. 24, 2008.

(Continued)

*Primary Examiner*—Jane Rhee
(74) *Attorney, Agent, or Firm*—McDermott Will & Emery LLP

(57) ABSTRACT

An electrochemical device having an electrode plate assembly that includes: (a) at least one first electrode; (b) at least one second electrode; and (c) a separator interposed between the first electrode and the second electrode, the electrode plate assembly including a PTC device. The use of the electrochemical device according to this invention makes it possible to efficiently manufacture secondary batteries with a simple structure, a high reliability and a high electrical capacity.

13 Claims, 6 Drawing Sheets

FOREIGN PATENT DOCUMENTS

| | | |
|---|---|---|
| JP | 59-161266 | 10/1984 |
| JP | 6-13067 | 1/1994 |
| JP | 06-020677 | 1/1994 |
| JP | 6-231749 | 8/1994 |
| JP | 6-231796 | 8/1994 |
| JP | 6-243877 | 9/1994 |
| JP | 07-220755 | 8/1995 |
| JP | 08-096792 | 4/1996 |
| JP | 9-120842 | 5/1997 |
| JP | 09-306548 | 11/1997 |
| JP | 10-50294 | 2/1998 |
| JP | 10-125353 | 5/1998 |
| JP | 10-302751 | 11/1998 |
| JP | 11-144704 | 5/1999 |
| JP | 2000-087847 | 3/2000 |
| JP | 2000-294222 | 10/2000 |
| JP | 2001-093583 | 4/2001 |
| JP | 2001-126707 | 5/2001 |
| JP | 2001-148244 | 5/2001 |
| JP | 2001-342782 | 12/2001 |
| JP | 2002-110137 | 4/2002 |
| JP | 2002-313431 | 10/2002 |
| JP | 2002-324542 | 11/2002 |
| WO | WO 95/31836 A | 11/1995 |
| WO | WO 99/67835 | 12/1999 |
| WO | WO 01/59870 A1 | 8/2001 |

OTHER PUBLICATIONS

Japanese Office Action issued in Japanese Patent Application No. JP 2003-024988, mailed Apr. 24, 2008.

European Search Report issued in European Patent Application No. EP 03777424.7-1227/1589597 PCT/JP0315757, dated Jul. 31, 2008.

* cited by examiner

ELECTROCHEMICAL DEVICE

TECHNICAL FIELD

The present invention relates to electrochemical devices, and particularly, to improvements in the electrode plate assembly of high energy-density secondary batteries, such as lithium ion secondary batteries.

BACKGROUND ART

With the reduction in size and weight of electronic and electric devices, there is an increasing demand for reductions in size and weight of secondary batteries. However, currently available secondary batteries have a complicated internal structure, so that there is a limit to improvements in electrical capacity per a given volume of a device. Also, complicated structure prevents improvements in reliability of batteries in some aspects. For example, a current-collecting tab or a current-collecting lead connected to an electrode may interfere with a homogeneous electrode reaction in the plane of the electrode. In the event that a cut section of the lead has metallic burrs that are larger than usual, an internal short-circuit may occur.

Secondary batteries have an electrode plate assembly including a positive electrode, a negative electrode and a separator. The electrode plate assembly is either of a layered type or a wound type. A layered type electrode plate assembly is obtained by alternately layering positive electrodes and negative electrodes with separators interposed between them. Also, a wound type electrode plate assembly is obtained by winding a long positive electrode and a long negative electrode with a separator between them. Such an electrode plate assembly usually has side faces where the edges of the positive and negative electrodes are flush with one another. In order to take out electricity from such side faces without causing an internal short-circuit, current-collecting tabs or current-collecting leads are necessary.

From the viewpoint of simplifying the internal structure of batteries, it has been proposed to cause a positive electrode to protrude from one side face of an electrode plate assembly and cause a negative electrode to protrude from the side face opposite the above-mentioned side face, in order to directly take out electricity from each side face without using current-collecting tabs or current-collecting leads. For example, for batteries with a layered type electrode plate assembly, a technique of integrally joining protruded electrode plates of the same polarity with a predetermined metal member has been proposed in Japanese Laid-Open Patent Publication No. 2001-126707. Also, for batteries with a wound type electrode plate assembly, a technique of joining the core material of a protruded electrode plate of the same polarity with a plate-shaped current collector plate has been proposed in Japanese Laid-Open Patent Publication No. 2000-294222.

However, in such cases where the positive electrode is caused to protrude from one side face of the electrode plate assembly and the negative electrode is caused to protrude from the side face opposite the above-mentioned side face, electrode plate assemblies must be produced one by one, so that the manufacturing process of the electrode plate assembly becomes complicated. That is, a problem of being unable to manufacture a plurality of electrode plate assemblies at the same time arises.

Also, it is known that when batteries are being charged/discharged, Joule's heat is generated in the batteries. In this case, as more current flows during charging/discharging, more heat is generated and more damage is caused by heat to battery components, which poses a problem. Also, there is another problem particularly with high-output batteries such as lithium batteries. When they become short-circuited, a large current flows, thereby resulting in a considerable increase in battery temperature.

In view of the above, an object of the present invention is to provide an electrochemical device with a simple structure, a high thermal reliability and a high electrical capacity. Also, another object is to provide electrochemical devices that can be efficiently manufactured in a large number at the same time.

DISCLOSURE OF INVENTION

The present invention is achieved in view of the circumstances as described above. The present invention can provide an electrochemical device with a simple structure, a high reliability and a high electrical capacity. Also, the present invention can efficiently manufacture a plurality of electrochemical devices at the same time.

That is, the present invention relates to an electrochemical device having an electrode plate assembly that comprises: (a) at least one first electrode; (b) at least one second electrode; and (c) a separator interposed between the first electrode and the second electrode, wherein the electrode plate assembly includes a PTC device.

It is preferred that the first electrode (a) comprise a first current collector sheet having a conductive area and an insulating area and at least one first electrode mixture layer carried thereon, and that the second electrode (b) comprise a second current collector sheet having a conductive area and an insulating area and at least one second electrode mixture layer carried thereon.

Also, the electrode plate assembly may be a layered-type electrode plate assembly obtained by layering the first electrode, the second electrode and the separator. Alternatively, it may be a wound-type electrode plate assembly obtained by layering and winding the first electrode, the second electrode and the separator.

When the electrode plate assembly is a layered-type electrode plate assembly, it is preferred that the conductive area of the first current collector sheet be connected to a first terminal on a first side face of the layered-type electrode plate assembly, that the conductive area of the second current collector sheet be connected to a second terminal on a second side face of the layered-type electrode plate assembly, that the insulating area of the first current collector sheet be positioned on the second side face, and that the insulating area of the second current collector sheet be positioned on the first side face.

It is preferred that the PTC device be shaped like a sheet. The PTC device may be positioned on the first side face or the second side face. Alternatively, it may be positioned in parallel with the first electrode, the second electrode and the separator in the layered-type electrode plate assembly. Of course, it may be positioned at the outermost part of the layered-type electrode plate assembly.

It is also preferred that the insulating area of the first current collector sheet and the insulating area of the second current collector sheet be positioned on the side faces of the layered-type electrode plate assembly other than the first side face and the second side face.

It is also preferred that the layered-type electrode plate assembly have a side face on which the insulating area of the first current collector sheet and/or the insulating area of the second current collector sheet are/is positioned, other than the first side face and the second side face.

It is also preferred that the first side face and the second side face be positioned on opposite sides of the layered-type electrode plate assembly.

It is also preferred that a first insulating material portion be provided between the first terminal and the first side face for insulating the first terminal from the second electrode, and that a second insulating material portion be provided between the second terminal and the second side face for insulating the second terminal from the first electrode.

When the electrode plate assembly is a wound-type electrode plate assembly, it is preferred that the conductive area of the first current collector sheet be connected to a first terminal on a first bottom face of the wound-type electrode plate assembly, that the conductive area of the second current collector sheet be connected to a second terminal on a second bottom face of the wound-type electrode plate assembly, that the insulating area of the first current collector sheet be positioned on the second bottom face, and that the insulating area of the second current collector sheet be positioned on the first bottom face.

It is also preferred that the PTC device be shaped like a round plate.

It is also preferred that the PTC device be positioned on the first bottom face or the second bottom face.

It is also preferred that a first insulating material portion be provided between the first terminal and the first bottom face for insulating the first terminal from the second electrode, and that a second insulating material portion be provided between the second terminal and the second bottom face for insulating the second terminal from the first electrode.

In other words, the present invention relates to an electrochemical device having a wound-type electrode plate assembly in which a first electrode and a second electrode are wound with a separator interposed therebetween. The first electrode comprises a first current collector sheet having a conductive area and an insulating area and at least one first electrode mixture layer carried thereon. The second electrode comprises a second current collector sheet having a conductive area and an insulating area and at least one second electrode mixture layer carried thereon. The conductive area of the first current collector sheet is connected to a first terminal on a first bottom face of the electrode plate assembly. The conductive area of the second current collector sheet is connected to a second terminal on a second bottom face of the electrode plate assembly. The insulating area of the first current collector sheet is positioned on the second bottom face. The insulating area of the second current collector sheet is positioned on the first bottom face. Further, a PTC device is included.

In the case of a wound-type electrode plate assembly, it is preferred that the PTC device be connected in series to one of the first terminal and the second terminal.

It is also preferred that the PTC device be shaped like a flat plate or a round plate.

It is also preferred that the PTC device be positioned on the first bottom face or the second bottom face.

Also, the present invention pertains to an electrochemical device having a wound-type electrode plate assembly in which a first electrode and a second electrode are wound with a separator interposed therebetween. The first electrode comprises a first current collector sheet having a conductive area and an insulating area and at least one first electrode mixture layer carried thereon. The second electrode comprises a second current collector sheet having a conductive area and an insulating area and at least one second electrode mixture layer carried thereon. The conductive area of the first current collector sheet is connected to a first terminal on a first bottom face of the electrode plate assembly. The conductive area of the second current collector sheet is connected to a second terminal on a second bottom face of the electrode plate assembly. The insulating area of the first current collector sheet is positioned on the second bottom face. The insulating area of the second current collector sheet is positioned on the first bottom face. A first insulating material portion is provided between the first terminal and the first bottom face for insulating the first terminal from the second electrode, and a second insulating material portion is provided between the second terminal and the second bottom face for insulating the second terminal from the first electrode. Further, a PTC device is included.

Further, the present invention is directed to an electrochemical device having a layered-type electrode plate assembly in which a plurality of first electrodes and a plurality of second electrodes are alternately layered with separators interposed therebetween. The plurality of first electrodes each comprise a first current collector sheet having a conductive area and an insulating area and at least one first electrode mixture layer carried thereon. The plurality of second electrodes each comprise a second current collector sheet having a conductive area and an insulating area and at least one second electrode mixture layer carried thereon. The conductive area of the first current collector sheet is connected to a first terminal on a first side face of the electrode plate assembly, and the conductive area of the second current collector sheet is connected to a second terminal on a second side face of the electrode plate assembly. The insulating area of the first current collector sheet is positioned on the second side face, and the insulating area of the second current collector sheet is positioned on the first side face. Further, a PTC device is included.

In the case of a layered-type electrode plate assembly, it is also preferred that the PTC device be connected in series to one of the first terminal and the second terminal.

It is also preferred that the PTC device be shaped like a sheet.

It is also preferred that the PTC device be positioned at the outermost part of the electrode plate assembly. It may be positioned on the first side face or the second side face.

Further, the present invention is directed to an electrochemical device having a layered-type electrode plate assembly in which a plurality of first electrodes and a plurality of second electrodes are alternately layered with separators interposed therebetween. The plurality of first electrodes each comprise a first current collector sheet having a conductive area and an insulating area and at least one first electrode mixture layer carried thereon. The plurality of second electrodes each comprise a second current collector sheet having a conductive area and an insulating area and at least one second electrode mixture layer carried thereon. The conductive area of the first current collector sheet is connected to a first terminal on a first side face of the electrode plate assembly, and the conductive area of the second current collector sheet is connected to a second terminal on a second side face of the electrode plate assembly. The insulating area of the first current collector sheet is positioned on the second side face, and the insulating area of the second current collector sheet is positioned on the first side face. A first insulating material portion is provided between the first terminal and the first side face for insulating the first terminal from the second electrodes, and a second insulating material portion is provided between the second terminal and the second side face for insulating the second terminal from the first electrodes. Further, a PTC device is included.

Further, the present invention is directed to an electrochemical device having a layered-type electrode plate assembly in which a plurality of first electrodes and a plurality of second electrodes are alternately layered with separators interposed therebetween. The plurality of first electrodes each comprise a first current collector sheet having a conductive area and an insulating area and at least one first electrode mixture layer carried thereon. The plurality of second electrodes each comprise a second current collector sheet having a conductive area and an insulating area and at least one second electrode mixture layer carried thereon. The conductive area of the first current collector sheet is connected to a first terminal on a first side face of the electrode plate assembly, and the conductive area of the second current collector sheet is connected to a second terminal on a second side face of the electrode plate assembly. The insulating area of the first current collector sheet is positioned on all the side faces other than the first side face of the electrode plate assembly, and the insulating area of the second current collector sheet is positioned on all the side faces other than the second side face of the electrode plate assembly. Further, a PTC device is included.

Furthermore, the present invention is directed to an electrochemical device having an electrode plate assembly in which a plurality of first electrodes and a plurality of second electrodes are alternately layered with separators interposed therebetween. The plurality of first electrodes each comprise a first current collector sheet having a conductive area and an insulating area and at least one first electrode mixture layer carried thereon. The plurality of second electrodes each comprise a second current collector sheet having a conductive area and an insulating area and at least one second electrode mixture layer carried thereon. The conductive area of the first current collector sheet is connected to a first terminal on a first side face of the electrode plate assembly, and the conductive area of the second current collector sheet is connected to a second terminal on a second side face of the electrode plate assembly. The insulating area of the first current collector sheet is positioned oh all the side faces other than the first side face of the electrode plate assembly, and the insulating area of the second current collector sheet is positioned on all the side faces other than the second side face of the electrode plate assembly. A first insulating material portion is provided between the first terminal and the first side face for insulating the first terminal from the second electrodes, and a second insulating material portion is provided between the second terminal and the second side face for insulating the second terminal from the first electrodes. Further, a PTC device is included.

BEST MODE FOR CARRYING OUT THE INVENTION

First, an exemplary electrochemical device having a layered-type electrode plate assembly is described.

Figure 1:
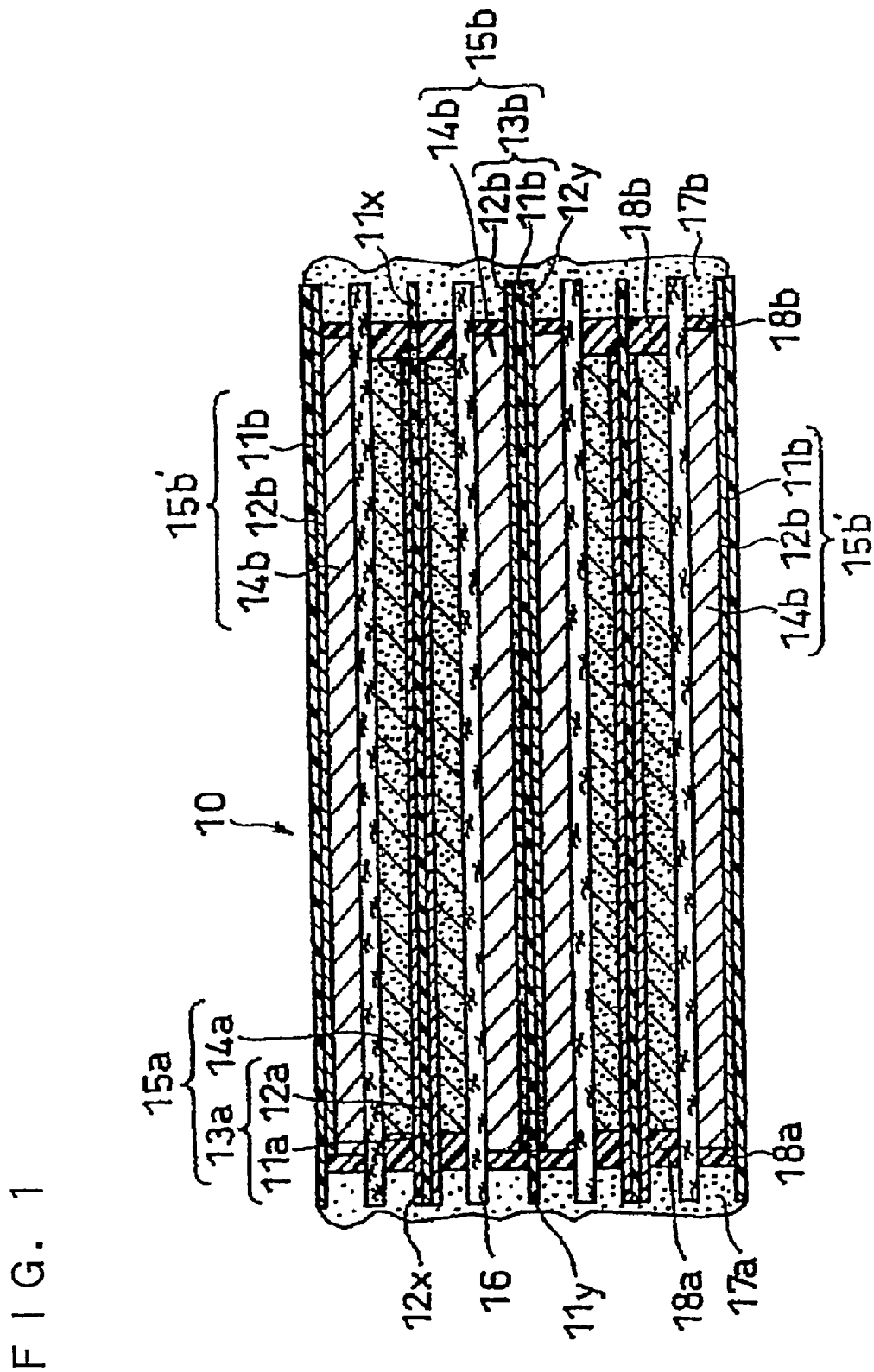
FIG. 1 is a longitudinal sectional view of a layered-type electrode plate assembly according to the present invention.

FIG. 1 shows a longitudinal sectional view of a layered-type electrode plate assembly of an electrochemical device from which a PTC device is omitted.

An electrode plate assembly 10 includes a plurality of first electrodes 15$a$ and a plurality of second electrodes 15$b$ which are layered alternately, with a separator 16 interposed between each first electrode 15$a$ and each second electrode 15$b$.

The first electrode 15$a$ comprises a first current collector sheet 13$a$ and two first electrode mixture layers 14$a$. The first current collector sheet 13$a$ is composed of a resin sheet 11$a$ and a conductive layer 12$a$ of a predetermined pattern formed on each side of the resin sheet 11$a$. That is, the first current collector sheet 13$a$ has a conductive area and an insulating area according to the pattern of the conductive layer.

In FIG. 1, the conductive layer 12$a$ is formed on the whole surface of the resin sheet except its edge 11$x$, or on the whole surface except the edge 11$x$ and the edges located on the back and front sides of the paper sheet of FIG. 1. On the conductive layer 12$a$ is formed the first electrode mixture layer 14$a$. In the first current collector sheet 13$a$ of FIG. 1, the edge 11$x$ of the resin sheet, or the edge 11$x$ and the edges located on the back and front sides of the paper sheet of FIG. 1, where there is no conductive layer, serve as insulating areas. At an edge 12$x$ of the conductive layer located opposite the edge 11$x$, there is left an exposed part of the conductive layer.

It is preferred that the thickness of the resin sheet be, for example, 0.5 to 500 μm. It is also preferred that the thickness of the conductive layer be 0.01 to 100 μm. Although the thickness of the first electrode mixture layer is not particularly limited, it is preferably 1 to 1000 μm, for example.

Examples of the materials which may be used for the resin sheet include: olefin polymers such as polyethylene, polypropylene and polymethylpentene; ester polymers such as polyethylene terephthalate, polybutylene terephthalate, polycyclohexylene dimethylene terephthalate, and polyarylate; thioether polymers such as polyphenylene sulfide; aromatic vinyl polymers such as polystyrene; nitrogen containing polymers such as polyimide and aramid resin; and fluoropolymers such as polytetrafluoroethylene and polyvinylidene fluoride. They may be used singly, or may be used in combination of two or more of them in the form of a copolymer, polymer alloy, polymer blend or the like.

A common resin sheet having a flat surface may be used, and perforated material, lath, porous material, net, foamed material, woven fabric, non-woven fabric and the like may be used. Also, a conductive sheet having an uneven surface may also be used.

The conductive layer may be made of an electronic conductor that causes no chemical change in the resultant battery, without any particular limitation. When the first electrode is the positive electrode, for example, stainless steel, aluminum, an aluminum alloy, titanium, or carbon may be used, and aluminum, an aluminum alloy or the like is particularly preferred. When the first electrode is the negative electrode, for example, stainless steel, nickel, copper, a copper alloy, or titanium is used, and copper, a copper alloy or the like is particularly preferred.

The method for forming the conductive layer is not particularly limited; however, for example, a conductive material may be vapor-deposited onto a resin sheet. In order to form a deposited film of a predetermined pattern, it is preferred to perform vapor deposition after a mask with an opening of a predetermined shape is fitted to the resin sheet.

The electrode plate assembly of FIG. 1 includes two kinds of second electrodes 15b and 15b'.

The inner second electrode 15b, which is sandwiched between two first electrodes 15a, has the same structure as that of the first electrode 15a, except that its orientation is reversed in the electrode plate assembly. That is, the inner second electrode 15b comprises a second current collector sheet 13b and two second electrode mixture layers 14b. The second current collector sheet 13b is composed of a resin sheet 11b and a conductive layer 12b of a predetermined pattern formed on each side of the resin sheet 11b. The second current collector sheet has a conductive area and an insulating area according to the pattern of the conductive layer.

In the second current collector sheet 13b of FIG. 1, an edge 11y of the resin sheet, or the edge 11y and the edges located on the back and front sides of the paper sheet of FIG. 1, where there is no conductive layer, serve as insulating areas. At an edge 12y of the conductive layer located opposite the edge 11y, there is left an exposed part of the conductive layer.

Meanwhile, the outermost two second electrodes 15b' have the same structure as that of the inner second electrode, except that the conductive layer 12b and the second electrode mixture layer 14b are formed on one side of the resin sheet 11b, not on both sides thereof.

The exposed part of the conductive layer 12a of the first current collector sheet 13a is positioned on a first side face of the electrode plate assembly, i.e., left side in FIG. 1, whereas the insulating area at the opposite end is positioned on a second side face of the electrode plate assembly, i.e., right side in FIG. 1. In FIG. 1, the first side face and the second side face are arranged on the opposite sides of the electrode plate assembly. However, the arrangement of the first side face and the second side face is not limited to this. In contrast, the exposed part of the conductive layer 12b of the second current collector sheet 13b is positioned on the first side face of the electrode plate assembly, whereas the insulating area at the opposite end is positioned on the second side face of the electrode plate assembly.

That is, in FIG. 1, the orientations of the first electrode 15a and the second electrode 15b, which have a similar structure, are opposite to each other. Thus, the exposed part of the conductive layer 12a of the first current collector sheet 13a is adjacent to the insulating area of the second current collector sheet 13b, and the exposed part of the conductive layer 12b of the second current collector sheet 13b is adjacent to the insulating area of the first current collector sheet 13a. In such an arrangement, the first electrode and the second electrode can be easily prevented from short-circuiting. Also, a high capacity battery of parallel connection can be easily obtained by connecting the exposed parts of the conductive layers of a plurality of first current collector sheets or second current collector sheets.

From the viewpoint of reliable prevention of a short-circuit, the electrode preferably has an insulating area with a width of 0.001 mm or more, and more preferably, 0.1 mm or more The exposed parts of the conductive layers of a plurality of first current collector sheets and second current collector sheets may be connected to one another by any method. For example, as illustrated in FIG. 1, a method of coating the first side face and the second side face with a conductive material can be used preferably. With respect to the thickness of the conductive material film, for example, approximately 0.01 to 1 mm is sufficient. In this case, while the conductive material and the exposed parts of the conductive layers can be connected, the conductive material can be used as a first terminal 17a or a second terminal 17b.

In order to obtain a good current-collecting state, the larger the contact area of the exposed part of the conductive layer with the conductive material, the more preferable. Also, the exposed part of the conductive layer is preferably buried in the conductive material film to a depth of 0.001 to 1 mm.

It is preferred that first insulating material portions 18a be provided between the first terminal and the first side face for insulating the first terminal from the second electrodes, and that second insulating material portions 18b be provided between the second terminal and the second side face for insulating the second terminal from the first electrodes.

The first side face is provided with the insulating areas of the second current collector sheets, whereas the second side face is provided with the insulating areas of the first current collector sheets. Therefore, the prevention of a short-circuit is possible even without providing the insulating material portions, but further providing the insulating material portions greatly improves the reliability of the secondary battery. Although the thickness of the insulating material portion is not particularly limited, it is preferably 0.001 mm or more, and further, 0.01 mm or more.

The method for forming the insulating material portion is not particularly limited; for example, it may be formed by applying a paste-like or liquid insulating material onto a predetermined position by screen printing or the like. Also, the insulating material portion can be formed by affixing an insulating material in the form of a film or tape to a predetermined position.

Examples of the insulating material used for the insulating material portion include resin, glass compositions, and ceramics. Composite materials made of resin-impregnated woven or non-woven fabric may also be used.

The resin may be a thermoplastic resin or a thermosetting resin. When a thermosetting resin is used, a step of curing a resin coating film by heating is necessary.

Examples of the resin which may be used for the insulating material portion include: olefin polymers such as polyethylene, polypropylene and polymethylpentene; ester polymers such as polyethylene terephthalate, polybutylene terephthalate, polycyclohexylene dimethylene terephthalate, polyarylate, and polycarbonate; ether polymers such as polyethylene oxide, polypropylene oxide, polyacetal, polyphenylene ether, polyether ether ketone, and polyetherimide; sulfone polymers such as polysulfone and polyether sulfone; acrylonitrile polymers such as polyacrylonitrile, AS resin, and ABS resin; thioether polymers such as polyphenylene sulfide; aromatic vinyl polymers such as polystyrene; nitrogen containing polymers such as polyimide and aramid resin; fluoropolymers such as polytetrafluoroethylene and polyvinylidene fluoride; and acrylic polymers such as polymethyl methacrylate. They may be used singly, or may be used in combination of two or more of them in the form of a copolymer, polymer alloy, a polymer blend or the like. Polymers obtained by polymerization and curing due to heating and UV radiation may also be used.

In FIG. 1, the second electrode mixture layer has a larger area than the first electrode mixture layer. In the case of a lithium ion secondary battery, it is preferred to employ such a structure in which the first electrode mixture layer is the positive electrode and the second electrode mixture layer is the negative electrode. On the other hand, if the first electrode mixture layer is the negative electrode and the second electrode mixture layer is the positive electrode, it is preferred that the area of the first electrode mixture layer be larger than that of the second electrode mixture layer.

Figure 2:
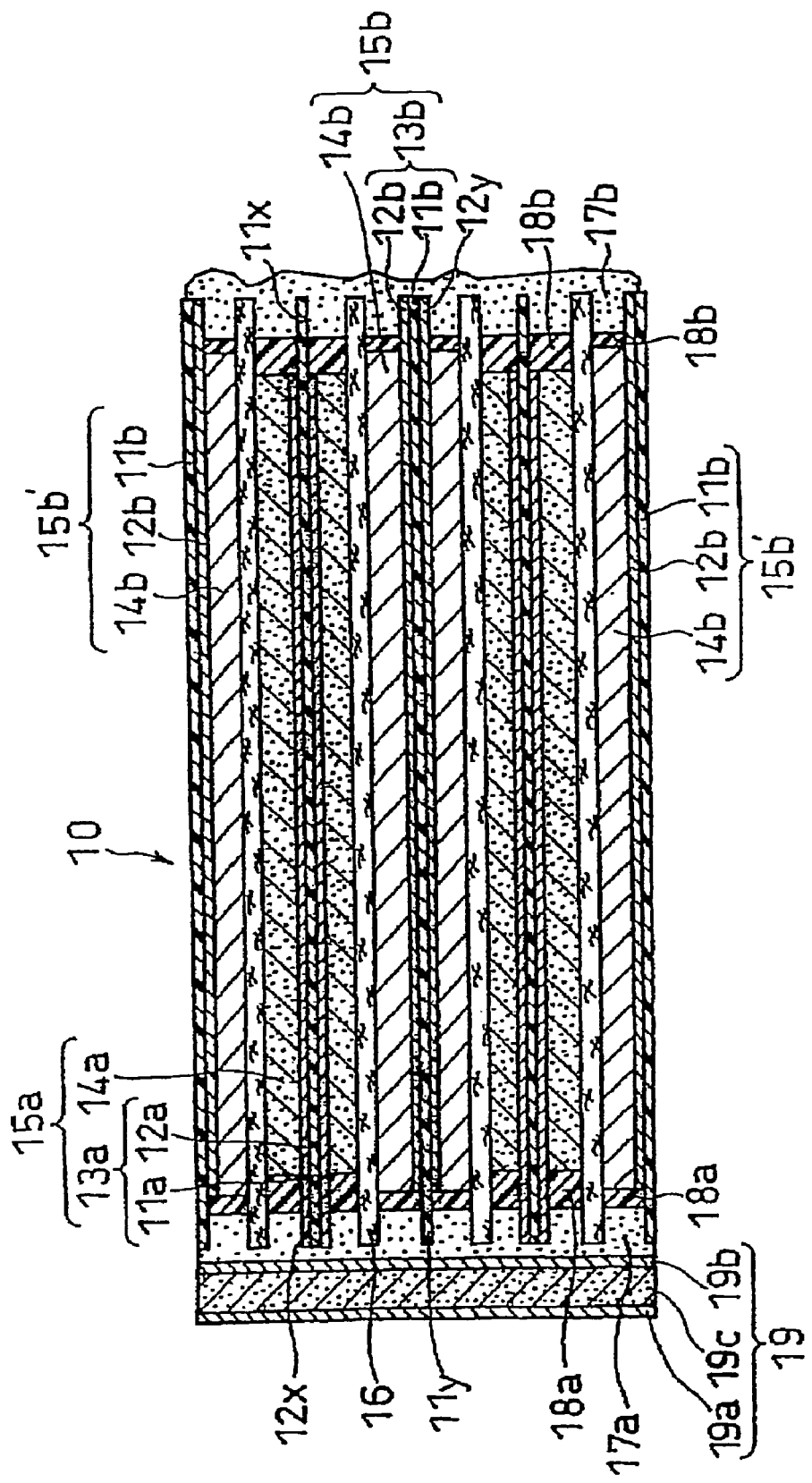
FIG. 2 is a longitudinal sectional view of a layered-type electrode plate assembly with a PTC device according to the present invention.
Figure 3:
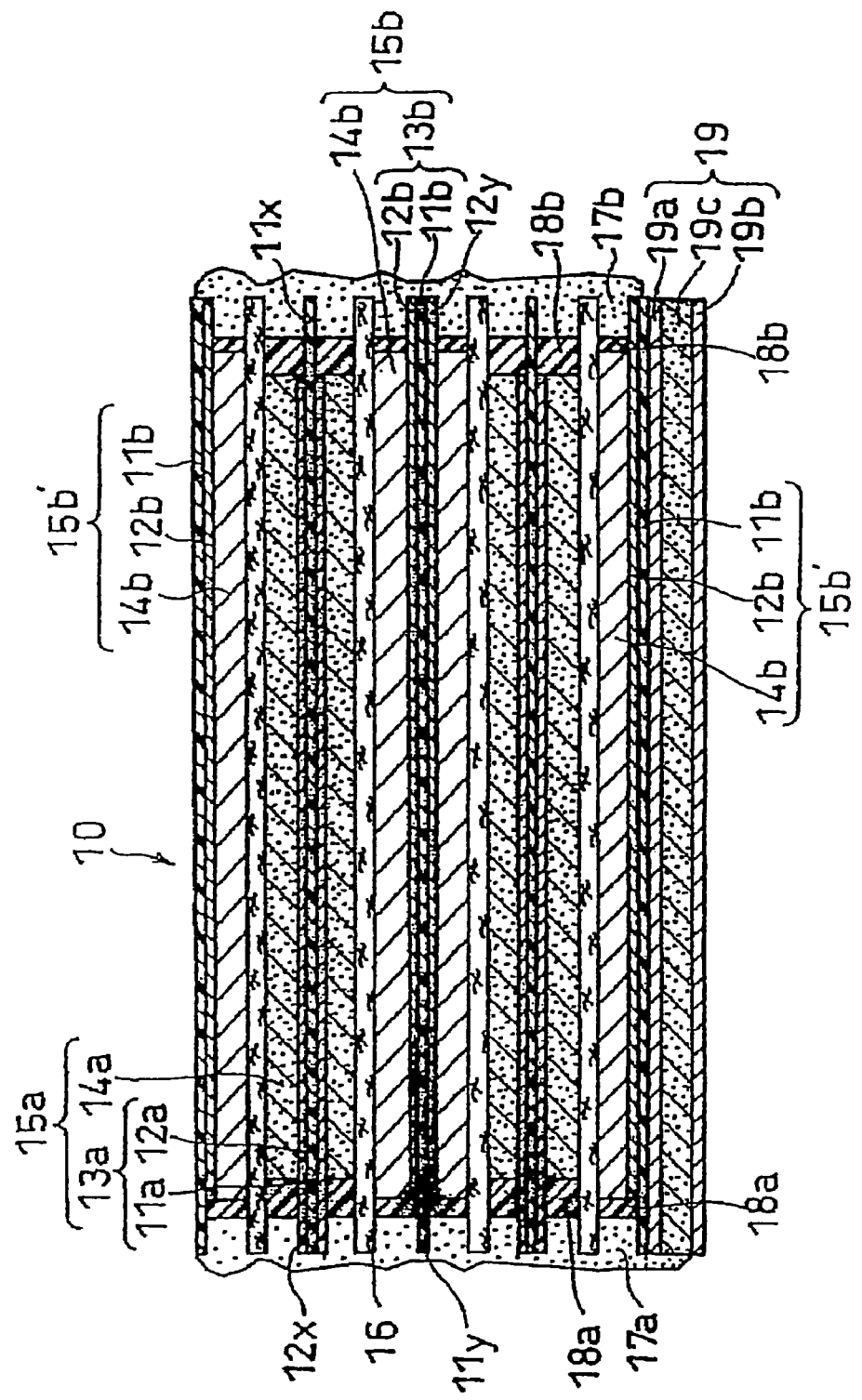
FIG. 3 is a longitudinal sectional view of a layered-type electrode plate assembly with a PTC device according to the present invention.

Next, FIGS. 2 and 3 are longitudinal sectional views of a layered-type electrode plate assembly with a PTC device. A layered-type electrode plate assembly 10 as illustrated in FIG. 2 has the same structure as that of the layered-type electrode plate assembly 10 as illustrated in FIG. 1, and further has a PTC device 19 connected to the first terminal 17a. Also, a layered-type electrode plate assembly 10 as illustrated in FIG. 3 has the same structure as that of the layered-type electrode plate assembly 10 as illustrated in FIG. 1, and further has a PTC device 19 disposed at the outermost part of the layered-type electrode plate assembly 10.

Such an electrode plate assembly is often accommodated with an electrolyte in a predetermined case when used.

The electrolyte varies according to the kind of the battery. In the case of a lithium ion secondary battery, an electrolyte prepared by dissolving a lithium salt in a non-aqueous solvent is used.

With respect to the shape, material, etc. of the case, there is no particular limitation.

Figure 4:
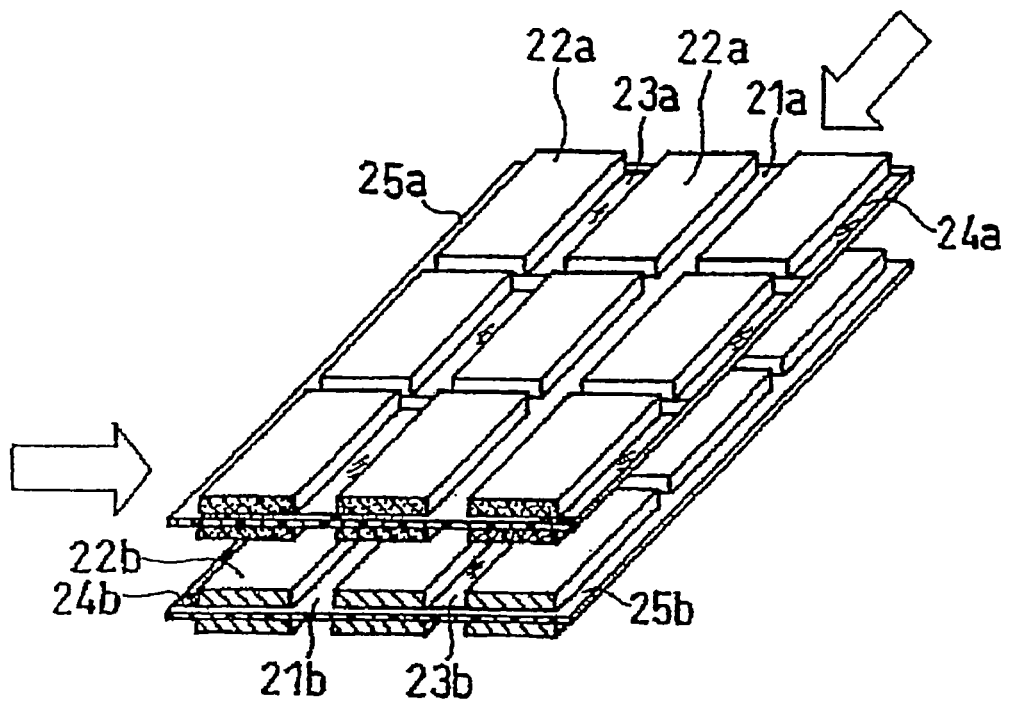
FIG. 4 is a schematic view of a group of first electrodes and a group of second electrodes, showing cutting positions thereof.

Referring now to FIG. 4, an exemplary method for producing the above-described layered-type electrode plate assembly is described.

(a) Preparation of First Electrode

First, a resin sheet 21a large enough to provide a desired number of current collector sheets is prepared. Subsequently, a plurality of conductive layers of a predetermined pattern are formed at the same positions on both sides of the resin sheet 21a. For example, conductive layers of a predetermined shape are formed on the resin sheet in a plurality of rows and a plurality of columns, as illustrated in FIG. 4. Such conductive layers can be obtained, for example, by covering the resin sheet with a mask having matrix-like openings and vapor-depositing metal on the parts of the resin sheet exposed from the openings.

Here, formation of one conductive layer so as to cover two current collector sheets is described. Specifically, in the case of using a resin sheet that is large enough to provide $2n$ current collector sheets, n conductive layers are formed per one side of the resin sheet.

Next, two first electrode mixture layers 22a are formed on each conductive layer. An exposed part 23a of the conductive layer having no material mixture is left between the two first electrode mixture layers 22a.

The first electrode mixture layers 22a are formed by applying a first electrode mixture paste onto the whole surfaces of the conductive layers except the middle parts. Although the application method is not particularly limited, the use of screen printing, pattern application or the like is preferable. The exposed part of each conductive layer, to which the mixture paste has not been applied, serves as a part 24a to be connected to a first terminal, after the production of an electrode plate assembly.

Although FIG. 4 illustrates electrode mixture layers in three rows and three columns, more conductive layers and more electrode mixture layers are usually formed on a larger current collector sheet.

The first electrode mixture is prepared by mixing an active material of the first electrode, a conductive agent, a binder and the like with a dispersion medium.

Thereafter, the coating film of the paste is dried, and the dried film is rolled with rollers in order to heighten the material mixture density.

When the first electrode is the positive electrode of a lithium ion secondary battery, for example, a lithium-containing transition metal oxide is preferably used as an active material. Examples of the lithium-containing transition metal oxide include $Li_xCoO_z$, $Li_xNiO_z$, $Li_xMnO_z$, $Li_xCo_yNi_{1-y}O_z$, $Li_xCo_fV_{1-f}O_z$, $Li_xNi_{1-y}M_yO_z$(M=Ti, V, Mn, Fe), $Li_xCo_aNi_b$-$M_cO_z$(M=Ti, Mn, Al, Mg, Fe, Zr), $Li_xMn_2O_4$, and $Li_xMn_{2(1-y)}M_{2y}O_4$(M=Na, Mg, Sc, Y, Fe, Co, Ni, Ti, Zr, Cu, Zn, Al, Pb, Sb).

However, due to the charge and discharge of the battery, the value x varies in the range of $0 \leq x \leq 1.2$. Also, $0 \leq y \leq 1$, $0.9 \leq f \leq 0.98$, $1.9 \leq z \leq 2.3$, $a+b+c=1$, $0 \leq a \leq 1$, $0 \leq b \leq 1$, and $0 \leq c < 1$. They may be used singly or in combination of two or more of them.

When the first electrode is the negative electrode of a lithium ion secondary battery, for example, lithium, a lithium alloy, an intermetallic compound, carbon material, an organic or inorganic compound capable of absorbing and desorbing lithium ions, a metal complex, an organic polymer compound, or the like may be preferably used as an active material. They may be used singly or in combination of two or more of them. Examples of the carbon material include coke, thermally decomposed carbon, natural graphite, artificial graphite, mesocarbon microbeads, graphitized mesophase microspheres, vapor-deposited carbon, glassy carbon, carbon fibers (polyacrylonitrile-based, pitch-based, cellulose-based, vapor-deposition type), amorphous carbon, and baked organic compounds. Among them, natural graphite and artificial graphite are particularly preferred.

As the conductive material, for example, carbon black, such as acetylene black, or graphite is used. Examples of the binder that can be used include fluorocarbon resins such as polyvinylidene fluoride and polytetrafluoroethylene, acrylic resins, styrene butadiene rubber, and ethylene-propylene terpolymers.

Next, an insulating material is applied onto the part of the edge of each first electrode mixture layer that will be adjacent to the exposed part of the conductive layer of the second current collector sheet when an electrode plate assembly is formed. It is also preferred to perform pattern application. Other parts of the edge of the first electrode mixture layer may also be covered with an insulating material. However, care should be taken not to cover the whole exposed part of the conductive layer of the first current collector sheet. In order to obtain an electrode plate assembly as illustrated in FIG. 1, an insulating material is applied onto at least the part of the edge of the first electrode mixture layer opposite the exposed part of the conductive layer.

It is noted, however, that the application of an insulating material is not always necessary, and may be performed optionally.

The applied insulating resin constitutes a first insulating material portion in the electrode plate assembly.

(b) Preparation of Second Electrode

Second electrodes having second electrode mixture layers on both sides can be produced in the same manner as the first electrodes. Specifically, a plurality of conductive layers of a predetermined pattern are formed at the same positions on both sides of a resin sheet 21b that is large enough to provide a desired number of current collector sheets, and two second electrode mixture layers 22b are formed on each conductive layer. An exposed part 23b of the conductive layer having no material mixture is left between the two second electrode mixture layers. The exposed part of the conductive layer, to which the mixture paste has not been applied, serves as a part 24b to be connected to a second terminal, after the production of the electrode plate assembly.

Second electrodes having second electrode mixture layers only on one side can be produced in the same manner as the above method, except that the conductive layer, the second electrode mixture layer and the insulating material are not provided on the other side.

(c) Preparation of PTC Device

The PTC device of the present invention is formed by sandwiching a conductive sheet between a first metal plate and a second metal plate. The conductive sheet contains a matrix of polymer material and a conductive filler.

While various materials can be used as the polymer material, it is preferred to use, for example, a crystalline polymer whose degree of crystallinity by differential scanning calorimetry (DSC) is at least 10%. The degree of crystallinity is preferably 30% or more, and more preferably 50% or more.

Exemplary polymer materials include polyolefins such as low-density polyethylene, medium-density polyethylene, high-density polyethylene and polypropylene, olefin copolymers such as a copolymer of ethylene and propylene, polyamide, polyester, fluoropolymers, and modified materials thereof. Among them, polyolefin is preferred, polyethylene is more preferred, and high-density polyethylene is further preferred. A matrix of polymer material may be composed of a plurality of polymer materials.

Examples of the conductive filler that combines with the polymer material to constitute the conductive sheet include: metal fillers such as Ni or Cu; carbon type conductive fillers such as glassy carbon or carbon black, e.g., graphite, ketjen black or acetylene black; conductive fibers such as carbon fiber or metal fiber; and mixtures thereof.

Among them, conductive fillers comprising glassy carbon are preferred. Among them, particularly preferred are particulate glassy carbon that is obtained by baking spherical phenolic resin in an inert atmosphere at a temperature of 1000° C. or higher.

The mean particle size of the conductive filler used in the present invention is preferably 1 to 50 µm, and more preferably 5 to 20 µm. If the mean particle size is less than 1 µm, the specific resistance at the peak tends to become smaller. On the other hand, if it is greater than 50 82 m, sparkling is apt to occur between particles.

Next, examples of the metal plate used in the present invention include metal plates such as gold, silver, copper, aluminum, nickel, stainless steel, iron, iron alloy and copper alloy. Among them, nickel, copper, aluminum and stainless steel are preferred. Also, a different metal may be plated on the surface. It is more preferred to use nickel foil or nickel-plated foil whose resistance is unlikely to increase by the oxidation upon thermo-compression bonding.

The mixing ratio between the polymer material and the conductive filler, which constitute the conductive sheet, is preferably 20:80 to 80:20 by weight, and more preferably 30:70 to 70:30. If the polymer material is less than 20% by weight, the strength of the conductive sheet tends to decrease, and if it exceeds 80% by weight, the resultant conductivity may become insufficient. Also, the conductive sheet may further contain an inorganic filler, such as alumina, aluminum hydroxide, calcium carbonate, magnesium silicate, talc or glass beads, an antioxidant, a flame retardant, etc., as long as it does not impair the effects of the present invention.

In the PTC device of the present invention, the conductive sheet and the metal plate may be joined together by thermo-compression bonding, as will be described later, but an adhesive layer may be formed.

Exemplary binders used for forming an adhesive layer between the conductive sheet and the metal plate include acrylic resin, polyester resin, polyurethane resin, phenolic resin, epoxy resin, chloroprene rubber, nitrile rubber, epoxy phenol, butyral phenol, nitrile phenol, ethylene-vinyl acetate copolymer, ethylene-acrylic acid ester copolymer, ethylene-acrylic acid copolymer, ethylene-maleic acid copolymer, ethylene-maleic anhydride graft copolymer, ethylene-methacrylic acid glycidyl-vinyl acetate ternary copolymer, ionomer copolymer, and various polymer alloys.

To produce a PTC device, first, a polymer material and a conductive filler are preliminarily mixed, using a melting/mixing device such as a kneader, a roll mill, a Bumbury's mixer, a plast mill or an extruder, or a dry blend device such as a Henschel mixer. The resultant mixture is then molded by a melt molding method such as molding under heat and pressure, extrusion or injection molding, to produce a conductive sheet.

Also, a conductive sheet can be produced by one process of melt molding without the above-mentioned preliminary mixing process. However, preliminary mixing is preferable in order to obtain a conductive sheet in which a polymer material and a conductive filler are mixed more homogeneously. The molding temperature for melt molding (including melting and kneading) is preferably the melting point of a polymer material to the melting point+150° C., and more preferably the melting point+10° C. to the melting point +100° C. If the temperature is lower than the melting point, the mixing tends to become inhomogeneous. If the temperature is higher than the melting point+150° C., the polymer material tends to deteriorate.

Subsequently, the conductive sheet and two metal plates are jointed by thermo-compression bonding. The pressure and temperature can be selected as appropriate by one with ordinary skill in the art, according to the kind, etc. of the polymer material.

An adhesive layer can be formed, for example, by a method such as roll coater, brush application, spatula application, spraying, screen printing or molding under heat and pressure. A formation method can be selected as appropriate, depending on the form of the binder serving as an adhesive layer. For example, when the binder is in the form of paste and emulsion, brush application, spatula application, screen printing and the like may be employed.

After the formation of the adhesive layer, both sides of the conductive sheet are sandwiched between the metal plates such that the adhesive layer intervenes between the conductive sheet and the metal plates, and the metal plates are then hot-pressed to the conductive sheet. The temperature and pressure can also be selected as appropriate by one with ordinary skill in the art, according to the kind, etc. of the binder.

The size and thickness of the PTC device according to the present invention may vary with the size of the electrode plate assembly, specification, overvoltage, overcurrent, etc., but they may be adjusted as appropriate by one with ordinary skill in the art.

(d) Production of Electrode Plate Assembly

A group of first electrodes and a group of second electrodes thus produced are layered, with a separator interposed therebetween. At this time, they are layered such that the first electrode mixture layers 22a of the first electrode face the second electrode mixture layers 22b of the second electrode. Further, both electrode plates are arranged such that the exposed part 23a of the conductive layer and the insulating material in the first electrode face the insulating material and the exposed part 23b of the conductive layer in the second electrode, respectively. A pair of second electrodes having the second electrode mixture layers only on one side, is then disposed on both outermost sides so as to sandwich the inner electrodes, and the whole is pressed. This produces a group of a plurality of electrode plate stacks.

As the separator, woven fabric or non-woven fabric made of an olefin polymer, such as polyethylene or polypropylene, or glass fibers may be used.

Also, a solid electrolyte or gel electrolyte may be used as the separator.

For the solid electrolyte, for example, polyethylene oxide or polypropylene oxide may be used as a matrix material.

As the gel electrolyte, for example, a non-aqueous electrolyte that is described below and retained by a matrix of polymer material may be used. Examples of the matrix-forming polymer material that may be used include polyethylene oxide, polypropylene oxide, polyvinylidene fluoride, and a copolymer of vinylidene fluoride and hexafluoropropylene. They may be used singly or in combination of two or more of them. Among them, the use of a copolymer of vinylidene fluoride and hexafluoropropylene and a mixture of polyvinylidene fluoride and polyethylene oxide is particularly preferred.

Next, the group of a plurality of electrode plate stacks is divided into individual electrode plate stacks. At this time, the first electrodes and the second electrodes are cut along the directions of the arrows illustrated in FIG. 4. The cut sections of the current collector sheets at the exposed parts of the conductive layers serve as the terminal connecting parts 24a and 24b. The opposite cut sections 25a and 25b at the exposed parts of the resin sheets serve as the insulating areas.

In the case of conventionally-used current collectors made of metal foil, a problem of metallic burrs arises when they are cut. Metallic burrs penetrate the separator and become a large cause of internal short-circuits. Thus, preventing the occurrence of metallic burrs becomes important, but cutting metal foil without producing metallic burrs is extremely difficult.

On the other hand, when a current collector sheet made of a resin sheet is used, metallic burrs do not occur since most of the cut section is composed of resin. Thus, the reliability of the electrochemical device can be significantly improved.

Subsequently, the side face where the exposed part of the conductive layer of the first current collector sheet and the insulating area of the second current collector sheet align alternately is coated with a metal. For example, by spraying molten or half-molten metal fine particles on the above-mentioned side face, the side face can be coated with the metal. On the side face, since the edge of the second electrode has the insulating material applied thereto, the metal film and the second electrode are prevented from short-circuiting. The metal coating film thus obtained is electrically connected only to the exposed part of the conductive layer of the first current collector sheet.

In the same manner as the above, the side face where the exposed part of the conductive layer of the second current collector sheet and the insulating area of the first current collector sheet alternately align is also coated with a metal.

When the terminal serves as the positive electrode terminal, it is preferred to use aluminum powder as the metal fine particles. Also, when the terminal serves as the negative electrode terminal, it is preferred to use copper powder as the metal fine particles.

The metal coating film electrically connected to the conductive layer of the first current collector sheet and the metal coating film electrically connected to the conductive layer of the second current collector sheet function as the first terminal and the second terminal, respectively.

Although the side faces of the electrode plate assembly having no terminal may be as it is, they are preferably coated with a porous insulating material.

Figure 5:
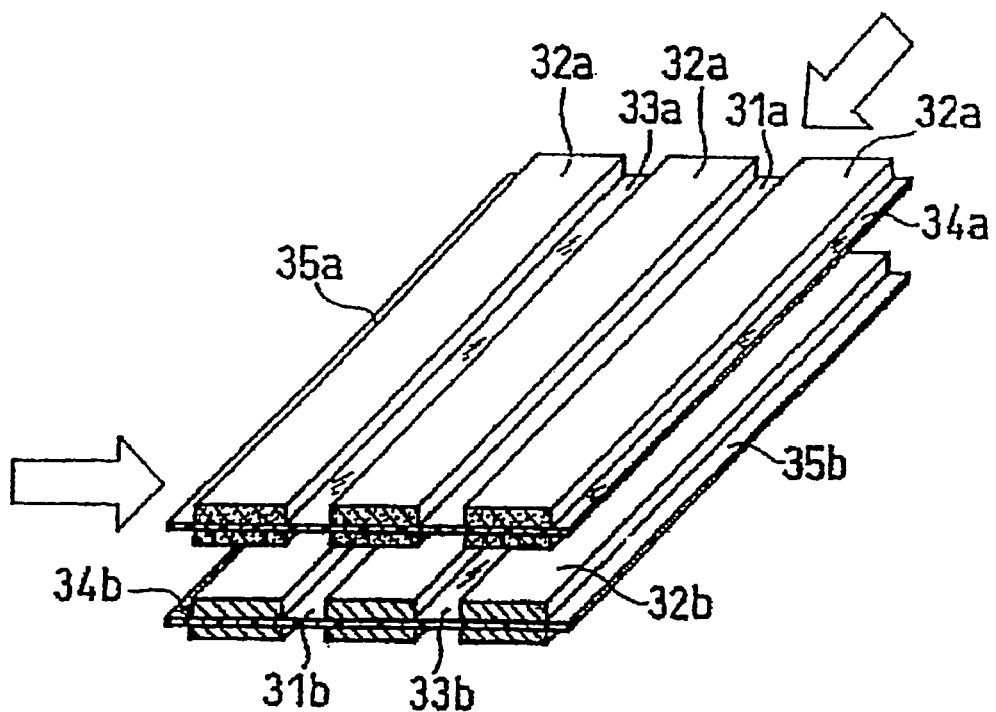
FIG. 5 is a schematic view of another group of first electrodes and another group of second electrodes, showing cutting positions thereof.

A group of electrode plate assemblies can also be obtained by using a group of a plurality of first electrodes and a group of a plurality of second electrodes as illustrated in FIG. 5.

To obtain such a group of first electrodes, a plurality of strip-shaped conductive layers are formed at the same positions on both sides of a resin sheet 31a that is large enough to provide a desired number of current collector sheets. Such conductive layers can be obtained, for example, by covering the resin sheet with a mask having strip-like openings and vapor-depositing metal on the parts of the resin sheet exposed from the openings. In this case also, one strip-shaped conductive layer is formed so as to cover two current collector sheets. Specifically, in the case of using a resin sheet that is large enough to provide 2n strip-shaped current collector sheets, n strip-shaped conductive layers are formed per one side of the resin sheet.

Next, two strip-shaped first electrode mixture layers 32a are formed on each strip-shaped conductive layer. An exposed part 33a of the conductive layer which carries no material mixture is left between the two strip-shaped first electrode mixture layers 32a. The strip-shaped first electrode mixture layers 32a are formed by applying the same first electrode mixture paste as the above to the whole surfaces of the conductive layers except the middle parts. The application method is the same as the layered-type electrode plate assembly. The exposed part 33a of each conductive layer, to which no paste has been applied, serves as a part 34a' to be connected to a first terminal.

Also, to obtain a group of second electrodes, a plurality of strip-shaped conductive layers are formed at the same positions on both sides of a resin sheet 31b that is large enough to provide a desired number of current collector sheets, and two strip-shaped second electrode mixture layers 32b are formed on each conductive layer. An exposed part 33b of the conductive layer having no material mixture is left between the two strip-shaped second electrode mixture layers. The exposed part of each conductive layer, to which no mixture paste has been applied, serves as a part 34b to be connected to a second terminal, after the production of an electrode plate assembly.

Such a group of electrode plate assemblies is divided into individual electrode plate stacks along the directions of the arrows illustrated in FIG. 5. Then, the cut sections of the current collector sheets at the exposed parts of the conductive layers constitute the connecting parts 34a and 34b to the terminal. The opposite cut sections 35a and 35b at the exposed parts of the resin sheets constitute insulating areas. At the other cut sections, sections of the mixture layers are exposed. In this case, it is preferred to seal the side faces of the electrode plate assembly where sections of the mixture layers are exposed with a porous insulating material.

Lastly, the PTC device 19 is jointed to the positions as shown in FIGS. 2 and 3. This joining may be done simply to connect the PTC device 19 in series to one of the terminals. For example, the PTC device can be joined by using the adhesive layer that was described regarding the production of the PTC device itself.

The resultant electrode plate assembly is accommodated with a predetermined electrolyte in a case of a predetermined shape, if necessary. As the case, for example, a stainless steel plate or an aluminum plate worked into a predetermined shape, an aluminum foil with a resin film on each side (aluminum laminate sheet), a resin case, etc. are used.

When the electrochemical device is, for example, a lithium ion secondary battery, an electrolyte composed of a non-aqueous solvent and a lithium salt dissolved therein is used. The lithium salt concentration in the electrolyte is preferably, for example, 0.5 to 1.5 mol/L.

Examples of the non-aqueous solvent which may be used include: cyclic carbonates such as ethylene carbonate, propylene carbonate, butylene carbonate, and vinylene carbonate; non-cyclic carbonates such as dimethyl carbonate, diethyl carbonate, ethylmethyl carbonate, ethylpropyl carbonate, methylpropyl carbonate, methyl isopropyl carbonate, and dipropyl carbonate; aliphatic carboxylic acid esters such as methyl formate, methyl acetate, methyl propionate, and ethyl propionate; γ-lactones such as γ-butyrolactone and γ-valerolactone; non-cyclic ethers such as 1,2-dimethoxyethane, 1,2-diethoxyethane, and ethoxymethoxyethane; cyclic ethers such as tetrahydrofuran and 2-methyl-tetrahydrofuran; alkylphosphoric acid esters such as dimethyl sulfoxide, 1,3-dioxolane, trimethyl phosphate, triethyl phosphate, and trioctyl phosphate; and fluorides thereof. It is preferred to combine two or more of them for use. Particularly, a mixture containing a cyclic carbonate and a non-cyclic carbonate, a mixture containing a cyclic carbonate, a non-cyclic carbonate and an aliphatic carboxylic acid ester, and the like are preferred.

Examples of the lithium salt that may be used include $LiPF_6$, $LiBF_4$, $LiClO_4$, $LiAlCl_4$, $LiSbF_6$, $LiSCN$, $LiCl$, $LiCF_3SO_3$, $LiCF_3CO_2$, $LiAsF_6$, $LiN(CF_3SO_2)_2$, $Li_2B_{10}Cl_{10}$, $LiN(C_2F_5SO_2)_2$, $LiPF_3(CF_3)_3$, and $LiPF_3(C_2F_5)_3$. They may be used singly or in combination of two or more of them. However, it is preferred that the electrolyte contain at least $LiPF_6$.

According to the above-described method, it is possible to efficiently produce electrode plate assemblies of a desired size that are, for example, 1 to 300 mm in length, 1 to 300 mm in width, and 0.01 to 20 mm in thickness.

Figure 6:
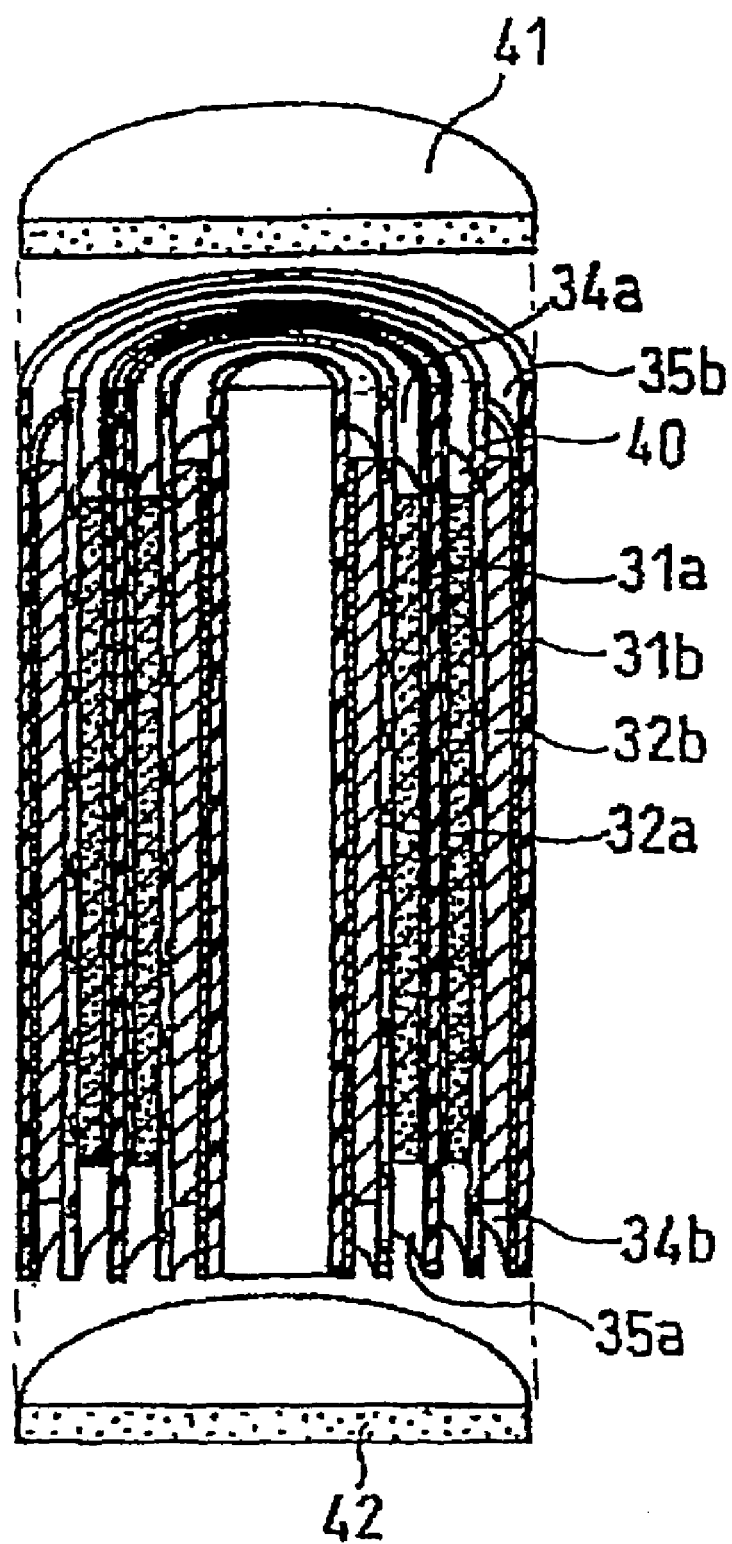
FIG. 6 is a schematic longitudinal sectional view of a wound-type electrode plate assembly according to the present invention.

Next, an exemplary method for producing a wound-type electrode plate assembly as illustrated in FIG. 6 is described. FIG. 6 is a schematic view of a part of a wound-type electrode plate assembly, featuring a first electrode and omitting a PTC device and outer parts such as a mixture layer and an electrode plate.

Figure 7:
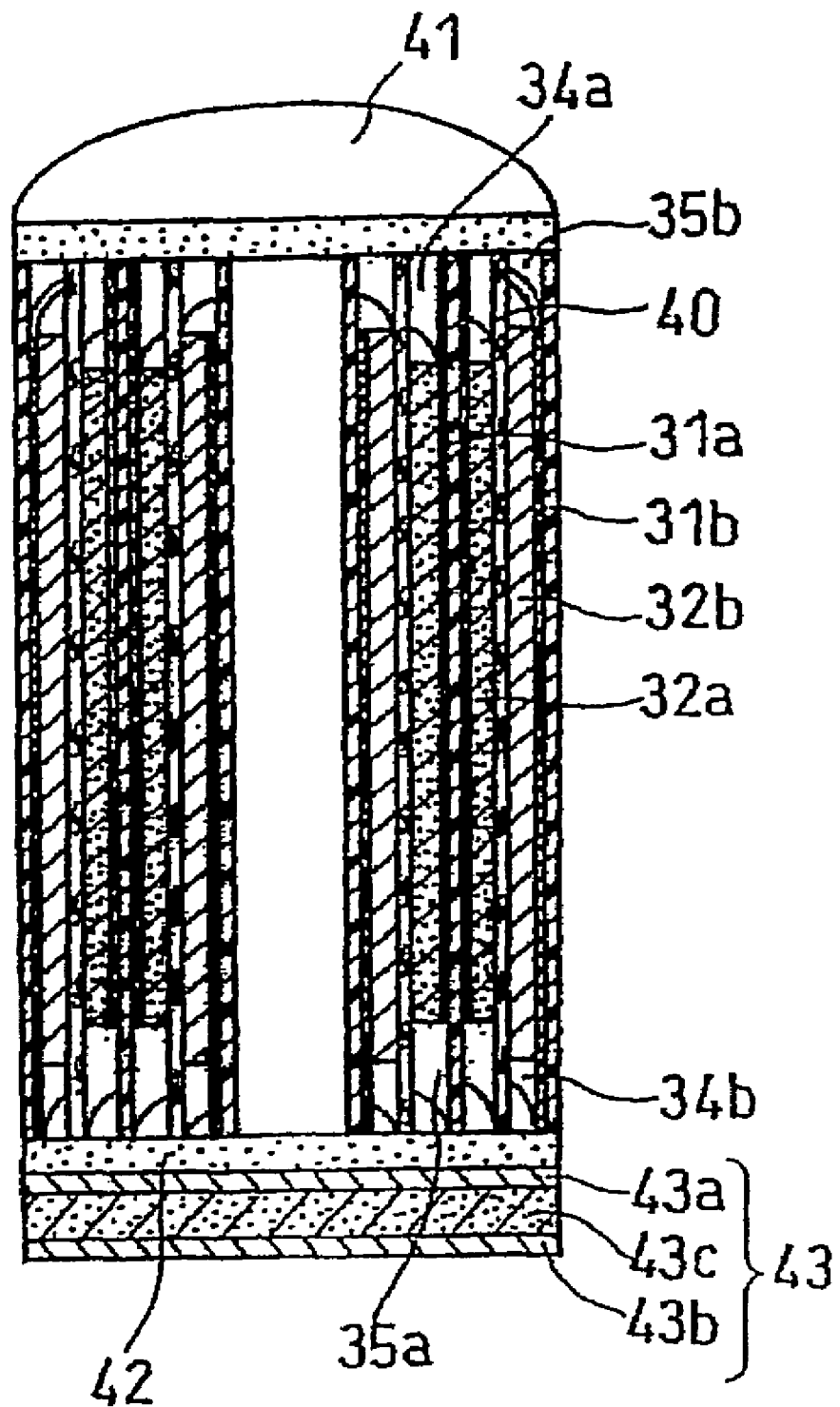
FIG. 7 is a schematic longitudinal sectional view of a wound-type electrode plate assembly with a PTC device according to the present invention.

FIG. 7 is a schematic view of a wound-type electrode plate assembly with a PTC device 43. As illustrated in FIG. 7, the PTC device 43 in the form of a disc is attached to a second terminal 42 on a bottom face of the wound-type electrode plate assembly. The PTC device 43 is also formed by sandwiching a conductive sheet 43c between a first metal plate 43a and a second metal plate 43b.

(a) Preparation of First Electrode

The first electrode used in the wound-type electrode plate assembly has the same structure as that of the first electrode used in the layered-type electrode plate assembly, except that it is shaped like a strip. Thus, the production method of the first electrode is essentially the same as that of the layered-type.

For example, a group of first electrodes the same as that of FIG. 5 is prepared. Then, in the same manner as in the above, an insulating material is applied onto at least the part of the edge of the first electrode mixture layer opposite the exposed part of the conductive layer. This portion is to be adjacent to the exposed part of the conductive layer of the second current collector sheet in the electrode plate assembly.

(b) Preparation of Second Electrode

A group of second electrodes the same as that of FIG. 5 is also prepared.

(c) Preparation of PTC Device

A disk-like PTC device is produced in the same manner as the above.

(d) Production of Electrode Plate Assembly

The group of first electrodes and the group of second electrodes are wound, with a separator 40 interposed therebetween. At this time, electrodes are arranged such that strip-shaped first electrode mixture layers 32a face second electrode mixture layers 32b. Further, both electrode plates are arranged such that the exposed part of the conductive layer and the insulating material in the first electrode face the insulating material and the exposed part of the conductive layer in the second electrode, respectively. This produces a group of a plurality of wound-type electrode plate assemblies that alternately align in opposite orientations, the group being in the form of a long cylinder.

Next, the long cylindrical group is divided into individual electrode plate assemblies. On one side face (bottom face) of the electrode plate assembly, the exposed part of the conductive layer of the first current collector sheet and the insulating area of the second current collector sheet alternately align concentrically. On the opposite side face (bottom face), the exposed part of the conductive layer of the second current collector sheet and the insulating area of the first current collector sheet alternately align concentrically.

Then, in the same manner as the above, the bottom face where the exposed part of the conductive layer of the first current collector sheet aligns and the bottom face where the exposed part of the conductive layer of the second current collector sheet aligns are coated with a metal, whereby a first terminal 41 and a second terminal 42 can be formed. Also, on the first terminal side, since the edge of the second electrode has the insulating material applied thereto, the metal coating film and the second electrode are prevented from short-circuiting. Also, on the second terminal side, since the edge of the first electrode has the insulating material applied thereto, the metal coating film and the first electrode are prevented from short-circuiting.

EXAMPLE 1

In this Example, a layered-type lithium ion secondary battery was produced in the following manner.

(a) Preparation of First Electrode

First, a sheet of polyethylene terephthalate (hereinafter referred to as "PET") of 198 mm in width, 282 mm in length, and 7 μm in thickness was prepared. Subsequently, using a mask with matrix-like openings, rectangular vapor-deposited films of copper (65 mm×46 mm) were formed in 3 rows and 6 columns at the same positions on both sides of the PET sheet. The thickness of the copper deposited films was made 0.1 μm.

Next, 100 parts by weight of spherical graphite (graphitized mesophase microspheres) serving as an active material and 3 parts by weight of styrene butadiene rubber serving as a binder were mixed with a suitable amount of aqueous carboxymethyl cellulose solution serving as a dispersion medium, to prepare a first electrode mixture paste.

This paste was then applied onto the whole surface of each deposited film excluding the middle part. As a result, two first electrode mixture layers of 32 mm×46 mm were formed on each deposited film. Between the two first electrode mixture layers was a 1 mm-wide groove-like exposed part of the copper deposited film, where there was no mixture.

Subsequently, the coating film of the paste was dried, and the dried coating film was rolled to a thickness of 70 µm with rollers.

Thereafter, an insulating material of polyvinylidene fluoride was applied in a width of 0.3 mm onto the part of the edge of each first electrode mixture layer opposite the part adjacent to the exposed part of the deposited film. In this way, a group of first electrodes having first electrode mixture layers in 6 rows and 6 columns on each side was obtained.

(b) Preparation of Second Electrode

First, second electrodes having second electrode mixture layers on both sides were prepared.

A PET sheet of 198 mm in width, 282 mm in length, and 7 µm in thickness was prepared. Subsequently, using a mask with matrix-like openings, rectangular vapor-deposited films of aluminum (64 mm×45 mm) were formed in 3 rows and 6 columns at the same positions on both sides of the PET sheet. The thickness of the Al deposited films was made 0.1 µm.

Next, 100 parts by weight of lithium cobaltate ($LiCoO_2$) serving as an active material, 3 parts by weight of acetylene black serving as a conductive agent, and 7 parts by weight of polyvinylidene fluoride serving as a binder were mixed with a suitable amount of aqueous carboxymethyl cellulose solution serving as a dispersion medium, to prepare a second electrode mixture paste.

This paste was then applied onto the whole surface of each deposited film excluding the middle part. As a result, two second electrode mixture layers of 31 mm×45 mm were formed on each deposited film. Between the two second electrode mixture layers was a 2 mm-wide groove-like exposed part of the Al deposited film, where there was no mixture.

Subsequently, the coating film of the paste was dried, and the dried coating film was rolled to a thickness of 70 µm with rollers.

Thereafter, an insulating material of polyvinylidene fluoride was applied in a width of 0.3 mm onto the part of the edge of each second electrode mixture layer opposite the part adjacent to the exposed part of the deposited film. In this way, a group of second electrodes having second electrode mixture layers in 6 rows and 6 columns on each side was obtained.

Also, second electrodes each having a second electrode mixture layer only on one side were prepared in the same manner as the above, except that the conductive layer, the second electrode mixture layer and the insulating material were not provided on the other side.

(c) Production of PTC Device

A conductive sheet was obtained by mixing 80 parts by weight of high-density polyethylene (thermal deformation temperature 48° C.), which is a polymer material, and 20 parts by weight of Ketjen black (oil absorption amount 1200 ml/100 g) and extruding the mixture into a sheet of 50 µm in thickness.

Subsequently, two nickel thin plates of approximately 25 µm in thickness were joined to both sides of the conductive sheet by thermo-compression bonding, to produce a PTC device.

(d) Preparation of Electrode Plate Assembly

First, a group of second electrodes having second electrode mixture layers on both sides was sandwiched between two groups of first electrodes having first electrode mixture layers on both sides, with a separator interposed therebetween. At this time, both electrode plates were arranged such that the first electrode mixture layers faced the second electrode mixture layers. Also, both electrode plates were arranged such that the exposed parts of the deposited films and the polyvinylidene fluoride in the first electrodes faced the polyvinylidene fluoride and the exposed parts of the deposited films in the second electrodes, respectively. A pair of second electrodes having second electrode mixture layers only on one side was disposed on both outermost sides, to sandwich the inner electrodes, and the whole was pressed. As a result, a group of a plurality of electrode plate stacks was obtained.

Next, the group of a plurality of electrode plate stacks was divided into individual electrode plate stacks, with the cutting positions being at the center of the exposed parts of the deposited films of the first electrodes and the center of the exposed parts of the deposited films of the second electrodes. As a result, a series of application and stacking steps produced as many as 36 electrode plate stacks at one time.

Half-molten copper fine particles were sprayed on the side face where the exposed parts of the copper deposited films of the first current collector sheets and the PET resin parts of the second current collector sheets aligned alternately. As a result, a 0.5 mm-thick copper film was formed on the side face. At this time, the exposed parts of the copper deposited films were buried in the copper film to a depth of 0.2 mm. This copper film was used as the negative electrode terminal as it was.

Thereafter, half-molten aluminum fine particles were sprayed on the side face where the exposed parts of the Al deposited films of the second current collector sheets and the PET resin parts of the first current collector sheets aligned alternately. As a result, a 0.5 mm-thick aluminum film was formed on the side face. The exposed parts of the Al deposited films were buried in the aluminum film to a depth of 0.2 mm. This aluminum film was used as the positive electrode terminal as it was. Lastly, the connection element of the PTC device produced in the above manner was jointed by spot welding to the copper film formed on the side face of the above-mentioned group.

With a lead wire connected to each of the copper film and the aluminum film of the resultant electrode plate assembly, a charge/discharge test was performed, using an external charge/discharge device.

The electrolyte used therein was prepared by dissolving $LiPF_6$ at a concentration of 1 mol/L in a solvent mixture consisting of ethylene carbonate (EC) and ethyl methyl carbonate (EMC) in a volume ratio of 30:70.

[Evaluation]

The charging and discharging were performed in an atmosphere of 20° C.

The charging and discharging were performed in a current mode of 2.5 mA/cm$^2$ relative to electrode area. The end-of-charge voltage was set to 4.2 V. The end-of-discharge voltage was set to 3.0 V. The electric capacity obtained under these conditions was 900 mAh.

For comparison, negative electrodes were produced by using conventionally-used core members of copper foil, and positive electrodes were produced by using core members of aluminum foil. In this case, in order to obtain a battery of the same capacity, the volume of the battery became 1.2 times as much as that of the lithium ion secondary battery of Example 1. This has clearly indicated that the present invention can heighten the energy density of the electrochemical device per capacity, as compared with the conventional one.

Also, even when a mechanical impact was applied to the lithium ion secondary battery of Example 1 by dropping it, no abnormality such as voltage drop due to an internal short-circuit was observed.

Thereafter, in order to check the effect of the PTC device, an overcharge test and an external short-circuit test were conducted. The electrochemical device according to the present invention has the PTC device near the electrode plate assembly. Therefore, it was possible to effectively detect abnormal heat generation of the electrochemical device and interrupt the circuit, which resulted in an increase in the safety of the electrochemical device.

INDUSTRIAL APPLICABILITY

As described above, according to the present invention, the structure of the positive electrode terminal and the negative electrode terminal is simple, and there is no need to use current collecting tabs or current collecting leads. Therefore, it is possible to provide an electrochemical device that is small but has a high electrical capacity and a high reliability. According to the present invention, a plurality of electrochemical devices can be efficiently manufactured at the same time. The use of non-aqueous electrolyte secondary batteries including such an electrochemical device makes it possible to provide highly reliable devices, such as cellular phones, portable information devices, camcorders, personal computers, PDAS, portable audio devices, electric vehicles, and power sources for load leveling.

The invention claimed is:

1. An electrochemical device having an electrode plate assembly that comprises: (a) at least one first electrode; (b) at least one second electrode; and (c) a separator interposed between the first electrode and the second electrode, wherein said electrode plate assembly includes a PTC device, said first electrode (a) comprises a first current collector sheet having a conductive area and an insulating area and at least one first electrode mixture layer carried thereon, said second electrode (b) comprises a second current collector sheet having a conductive area and an insulating area and at least one second electrode mixture layer carried thereon, said electrode plate assembly is a layered-type electrode plate assembly obtained by layering said first electrode, said second electrode and said separator, and the conductive area of said first current collector sheet is connected to a first terminal on a first side face of said layered-type electrode plate assembly, the conductive area of said second current collector sheet is connected to a second terminal on a second side face of said layered-type electrode plate assembly, the insulating area of said first current collector sheet is positioned on said second side face, and the insulating area of said second current collector sheet is positioned on said first side face, wherein said insulating area of said first current collector protrudes into the second terminal, and said insulating area of said second current collector protrudes into the first terminal.

2. The electrochemical device in accordance with claim 1, wherein said PTC device is shaped like a sheet.

3. The electrochemical device in accordance with any of claim 1, wherein said PTC device is positioned on said first side face or said second side face.

4. The electrochemical device in accordance with claim 1, wherein said PTC device is positioned in parallel with said first electrode, said second electrode and said separator in said layered-type electrode plate assembly.

5. The electrochemical device in accordance with claim 1, wherein the insulating area of said first current collector sheet and the insulating area of said second current collector sheet are positioned on the side faces of said layered-type electrode plate assembly other than said first side face and said second side face.

6. The electrochemical device in accordance with claim 1, wherein said layered-type electrode plate assembly has a side face on which the insulating area of said first current collector sheet and/or the insulating area of said second current collector sheet are/is positioned, other than said first side face and said second side face.

7. The electrochemical device in accordance with claim 1, wherein said first side face and said second side face are positioned on opposite sides of said layered-type electrode plate assembly.

8. The electrochemical device in accordance with claim 1, wherein a first insulating material portion is provided between said first terminal and said first side face for insulating said first terminal from said second electrode, and a second insulating material portion is provided between said second terminal and said second side face for insulating said second terminal from said first electrode.

9. The electrochemical device in accordance with claim 1, wherein said electrode plate assembly is a wound-type electrode plate assembly obtained by layering and winding said first electrode, said second electrode and said separator.

10. The electrochemical device in accordance with claim 9, wherein the conductive area of said first current collector sheet is connected to a first terminal on a first bottom face of said wound-type electrode plate assembly, the conductive area of said second current collector sheet is connected to a second terminal on a second bottom face of said wound-type electrode plate assembly, the insulating area of said first current collector sheet is positioned on said second bottom face, and the insulating area of said second current collector sheet is positioned on said first bottom face.

11. The electrochemical device in accordance with claim 9, wherein said PTC device is shaped like a flat plate or a round plate.

12. The electrochemical device in accordance with claim 9, wherein said PTC device is positioned on said first bottom face or said second bottom face.

13. The electrochemical device in accordance with claim 9, wherein a first insulating material portion is provided between said first terminal and said first bottom face for insulating said first terminal from said second electrode, and a second insulating material portion is provided between said second terminal and said second bottom face for insulating said second terminal from said first electrode.

* * * * *